United States Patent [19]
Knapp

[11] Patent Number: 5,504,478
[45] Date of Patent: Apr. 2, 1996

[54] RADIO FREQUENCY CONTROL SYSTEM

[75] Inventor: Robert C. Knapp, Coloma, Mich.

[73] Assignee: Gentex Corporation, Zeeland, Mich.

[21] Appl. No.: 180,565

[22] Filed: Jan. 12, 1994

[51] Int. Cl.⁶ ............................. G08C 19/00; H04Q 9/00; H04B 1/08
[52] U.S. Cl. .................. 340/825.69; 340/825.31; 455/345
[58] Field of Search ................... 455/345, 346, 455/347; 340/825.31, 825.69, 825.72, 825.3

[56] References Cited

U.S. PATENT DOCUMENTS

| | | | |
|---|---|---|---|
| 3,099,797 | 7/1963 | Piccinini | 455/345 |
| 3,939,423 | 2/1976 | Zakharov et al. | 455/345 |
| 3,950,701 | 4/1976 | Matuoka et al. | 455/345 |
| 4,672,375 | 6/1987 | Mochida et al. | 340/825.31 |
| 4,761,645 | 8/1988 | Mochida | 340/825.31 |
| 4,868,915 | 9/1989 | Anderson, III et al. | 340/825.31 |

*Primary Examiner*—Donald J. Yusko
*Assistant Examiner*—Mark H. Rinehart
*Attorney, Agent, or Firm*—Malcolm R. McKinnon

[57] ABSTRACT

A radio frequency control system is provided which is particularly adapted for use in connection with an automotive vehicle. The system includes code generating means and a radio frequency transmitter operatively associated with the code generating means. A first antenna is provided which is connected to the transmitter, and a radio frequency receiver is provided which is connected to a second antenna. Decoding means is connected to the receiver and includes at least one output adapted to control a safety unit. At least one of the antennas is incorporated in a rearview mirror installed on a vehicle.

15 Claims, 2 Drawing Sheets

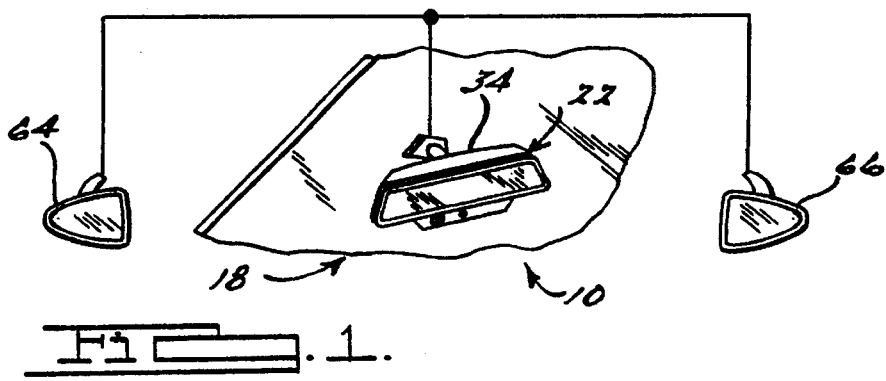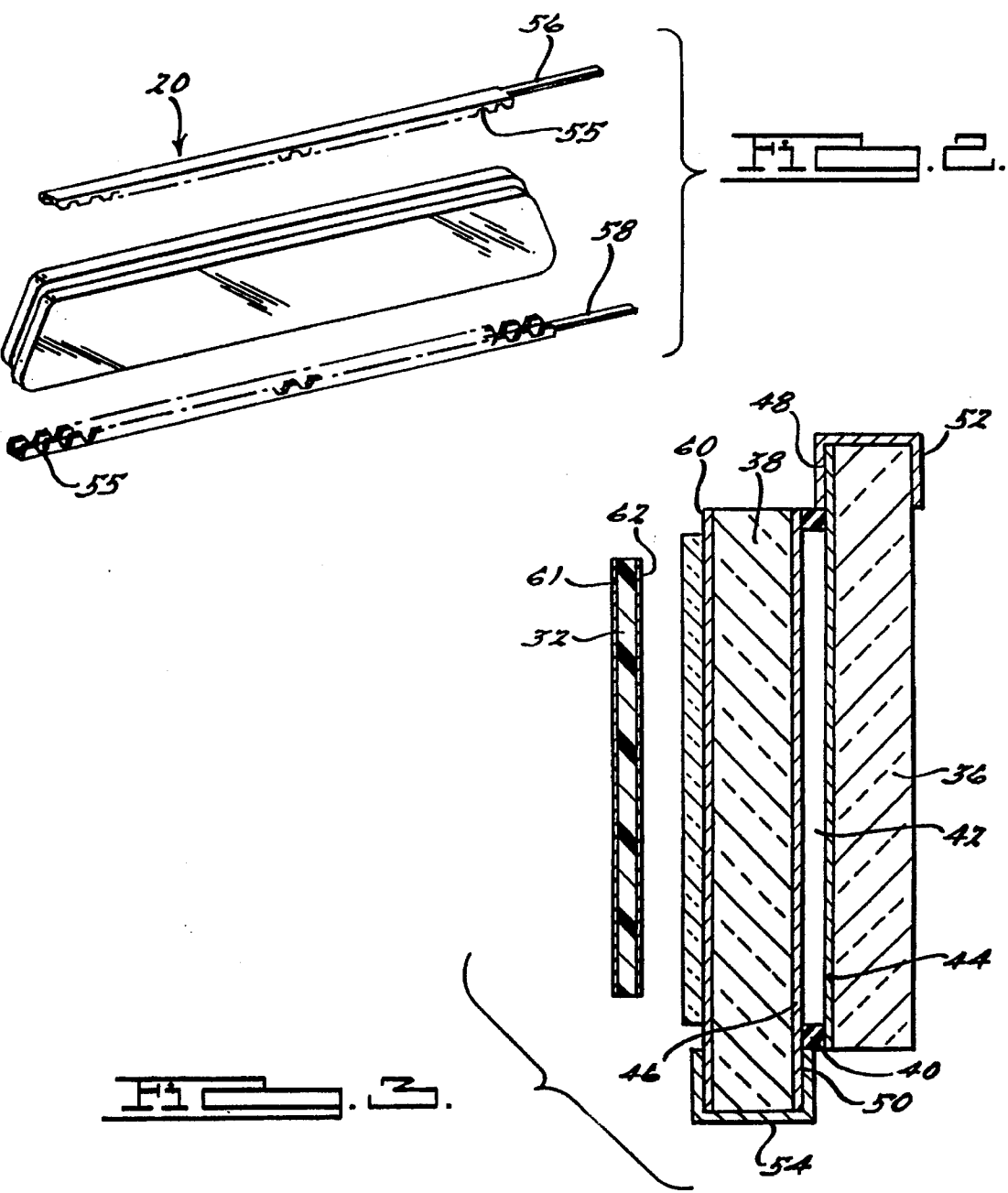

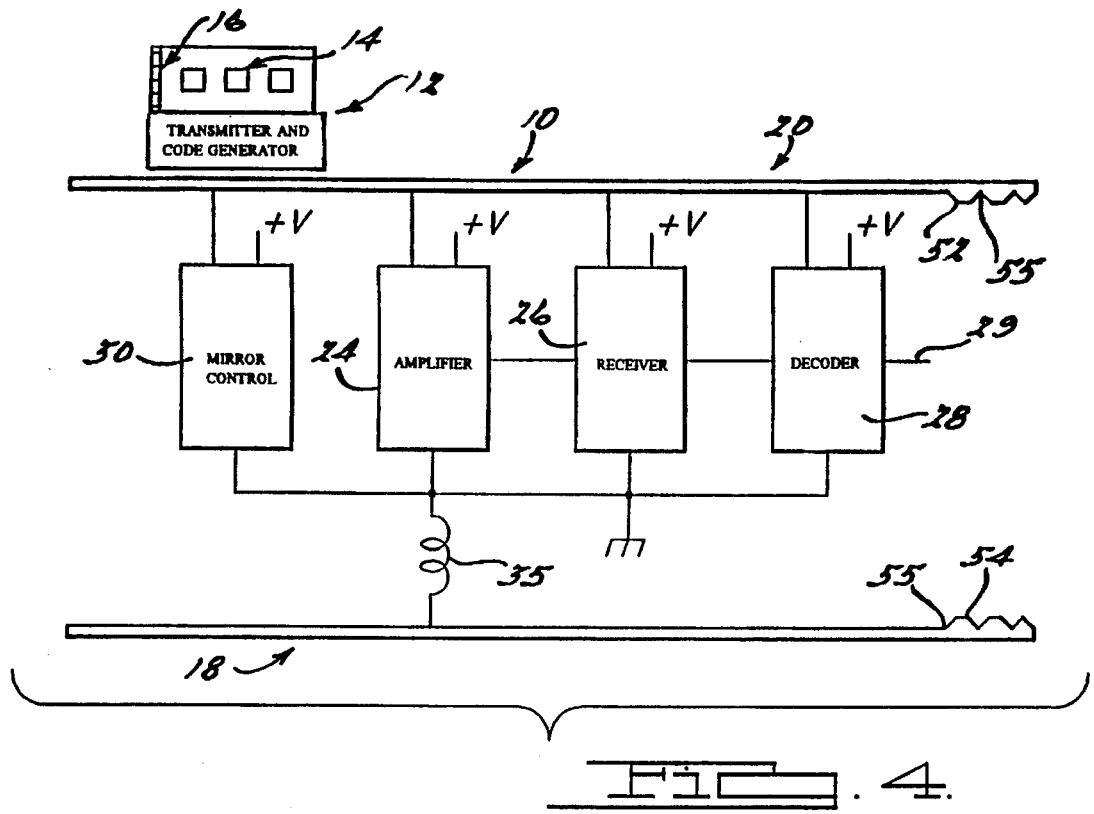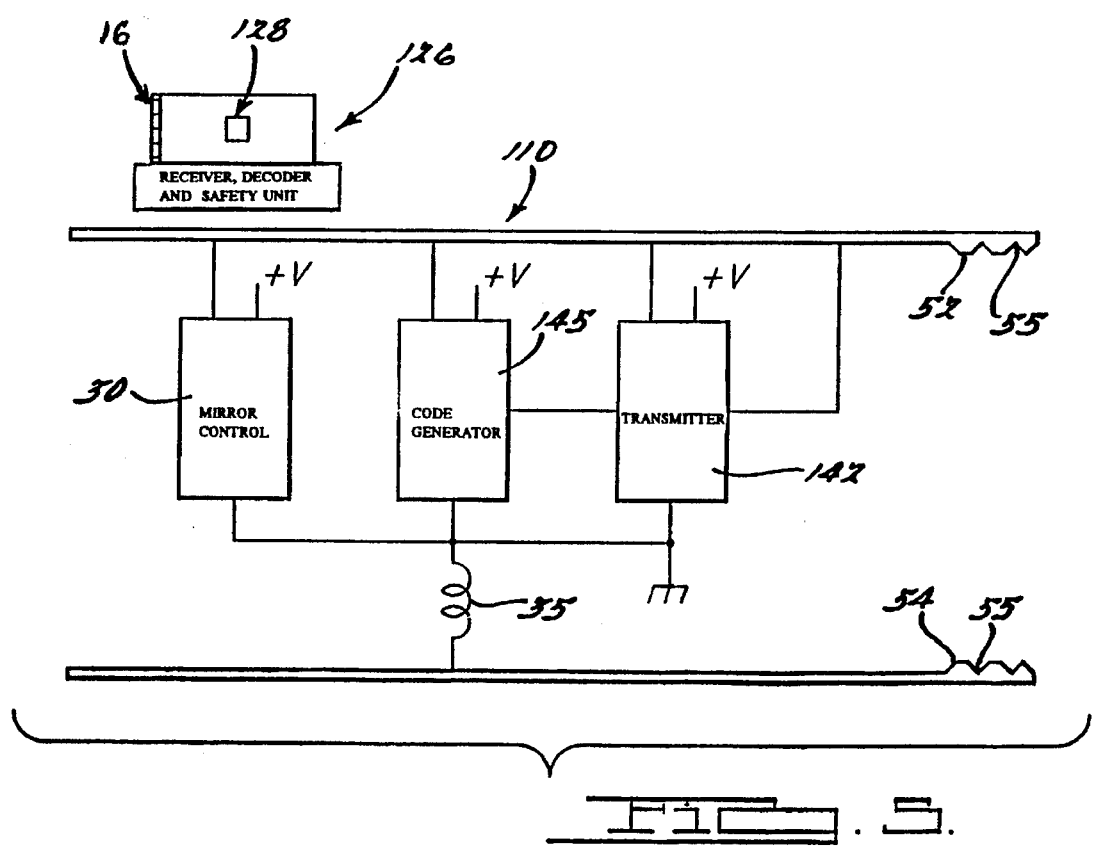

RADIO FREQUENCY CONTROL SYSTEM

This invention relates to radio frequency control systems and, more particularly, to an improved radio frequency control system particularly adapted for use in connection with automotive vehicles. As is well known in the art, radio frequency control systems are often provided on automotive vehicles to facilitate keyless remote entry and other functions such as security alarms, engine start controls and panic alarms providing features useful to the driver of the vehicle or to vehicle operations. Heretofore, radio frequency antennas that are adapted for use in connection with control systems of the indicated character have been positioned in a variety of locations on the automotive vehicle, depending on the available space and reception requirements. For example, some radio frequency receivers or transmitters are packaged in the trunk of the vehicle or in the doors or in the left or right kick panels, with the antenna running up the side posts or pillars, while other receivers or transmitters are located in the dashboard or behind the glove box with the antenna running along the dashboard. To date, there has not been a single satisfactory location that is applicable to all automotive vehicles.

An object of the present invention is to overcome disadvantages in prior radio frequency control systems of the indicated character and to provide an improved radio frequency control system incorporating a conductive surface in a rearview mirror, mounted on the vehicle, as a radio frequency antenna for sending and/or receiving radio frequency signals in a radio frequency control system.

Another object of the present invention is to provide an improved radio frequency control system including an antenna incorporated in a rearview mirror installed on the vehicle, and which mirror may be an automatic glare control rearview mirror or a manually actuated glare control rearview mirror.

Another object of the present invention is to provide an improved radio frequency control system in which electrically conductive elements in a rearview mirror are utilized to provide a radio frequency antenna.

Another object of the present invention is to provide an improved radio frequency control system including an antenna incorporated in a rearview mirror installed on the vehicle whereby the antenna is disposed in an ideal location for both radiation and reception of radio frequency signals from the interior of the vehicle to an exterior radio frequency communication device.

Another object of the present invention is to provide an improved radio frequency control system which includes an antenna incorporated in a rearview mirror installed on the vehicle and wherein the antenna is located in free space with respect to high density conductor materials, such as steel, aluminum and other electrically conductive materials in the vehicle.

Another object of the present invention is to provide an improved radio frequency control system including an antenna incorporated in a rearview mirror whereby the antenna is effective from substantially all directions encompassing the vehicle exterior.

Another object of the present invention is to provide an improved radio frequency control system which provides minimal influence respecting skewing of the radio frequency field patterns and which increases the efficiency of the system in substantially all directions.

Still another object of the present invention is to provide an improved radio frequency control system incorporating improved antenna means which accommodates radio frequency requirements across various vehicle models and vehicle platforms.

Yet another object of the present invention is to provide an improved radio frequency control system in combination with a rearview mirror for an automotive vehicle whereby the mirror can accommodate the electronic components required together with the antenna, all in one package which may be readily connected to the vehicle wiring harness.

The above as well as other objects and advantages of the present invention will become apparent from the following description, the appended claims, and the accompanying drawings.

BRIEF DESCRIPTION OF THE DRAWINGS

FIG. 1 is a perspective schematic view of an inside rearview mirror which is incorporated in a radio frequency control system embodying the present invention and which is shown installed on the windshield of a vehicle together with two outside rearview mirrors installed on the outside of the vehicle in a conventional manner whereby each of the mirrors faces rearwardly of the vehicle in a conventional manner;

FIG. 2 is a schematic exploded view of a portion of an electrochromic automatic rearview mirror which may be incorporated in a radio frequency control system embodying the present invention;

FIG. 3 is a schematic, exploded cross sectional view of the inside rearview mirror illustrated in FIG. 1;

FIG. 4 is a schematic block diagram of a radio frequency control system embodying the present invention; and FIG. 5 is a schematic block diagram of another embodiment of the invention.

DETAILED DESCRIPTION

Referring to the drawings, the present invention is illustrated as embodied in a radio frequency control system, generally designated 10, which is particularly adapted for use in connection with automotive vehicles, although it will be understood that the present invention is applicable to other uses. The control system 10 is comprised of a conventional, combined portable radio frequency transmitter and associated code generator unit 12 which is adapted to be carried by the operator of the vehicle, the combined transmitter and code generator being actuated by suitable push buttons, such as 14, or other suitable means, with the output of the code generator being connected to the transmitter portion of the unit 12 in a conventional manner whereby actuation of a push button, such as 14, by the user thereof is effective to automatically transmit a predetermined code at radio frequencies from a built-in antenna 16, incorporated in the unit 12. In this embodiment of the invention, the control system 10 also includes a mobile unit, generally designated 18, which is adapted to be installed in a vehicle such as an automobile, a truck, or other desired vehicle. The mobile unit 18 includes an antenna, generally designated 20, incorporated in a rearview mirror, generally designated 22, which is installed on the vehicle and which will be described hereinafter in greater detail. The mobile unit 18 also includes a conventional, commercially available amplifier 24 of the type usually utilized in an automotive vehicle security system and adapted to receive radio signals from the antenna 20 and supply the amplified signals to a conventional commercially available radio frequency receiver 26. The radio frequency receiver 26, in turn, supplies a digital serial signal to a conventional decoder 28 adapted to receive and decode signals initially generated by the combined transmitter and code generator unit 12, the decoder 28 having a data output such as 29 adapted to control conventional safety units (not shown) such as a keyless entry unit or security alarm and/or other safety units performing functions useful to the driver of the vehicle or the operation thereof. It will be understood that the safety units may be in the form of an electric door lock, a horn, a flashing light or other safety device as desired. It will be understood that the transmitter, the encoder, the amplifier, the radio frequency receiving unit and the decoding unit are all of conventional design and may be of the commercially available types conventionally utilized in commercially available security systems. The mobile unit 18 is preferably powered by the battery normally provided in the vehicle electrical system although a separate power supply may be provided if desired. The combined transmitter and code generator unit 12 is preferably powered by conventional batteries such as dry cells or conventional rechargeable batteries as desired.

The mobile unit 18 also includes the electronic circuitry 30 controlling the automatic rearview mirror 22. The circuitry 30 may, for example, may be mounted on a circuit board 32 disposed inside the housing 34 of the mirror 22. The circuitry 30 may be of the type described in detail in U.S. Pat. No. 5,204,778 issued Apr. 20, 1993 and assigned to the assignee of the present invention. It will be understood however, that other electronic circuitry may be utilized to control the reflective state of the mirror 22, and as described hereinafter in greater detail, the present invention may also be embodied in a manually actuated rearview mirror for automotive vehicles. In the embodiments of the invention illustrated, the circuitry includes a conventional radio frequency choke 35 which isolates the radio frequency ground and allows the D.C. return for the electrochromic elements.

In radio frequency control systems embodying the present invention, conductive surfaces in a rearview mirror for automotive vehicles are utilized as a radio frequency antenna for sending or receiving radio frequency signals for many automotive vehicle applications. The present invention applies to both automatic glare control rearview mirrors as well as manually actuated glare control rearview mirrors, electrically conductive mirror surfaces in such mirrors being utilized as, for example, a dipole radio frequency antenna or as a multielement array high frequency resonator. The multielement array provides expanded bandwidth as well as added power gain. It has been found that an inside rearview mirror for automotive vehicles provides an ideal location for both radiation and reception of radio frequency signals from the interior of the vehicle to an exterior radio frequency communication device. Inside rearview mirrors in automotive vehicles are located in free space with respect to high density conductor materials, such as steel, aluminum and other conductive materials in the vehicle, and the inside rearview mirror is visible from substantially all directions encompassing the vehicle exterior. Consequently, the inside rearview mirror, being located in free space with respect to such high density conductors, provides minimal influence respecting skewing of the radio frequency field patterns. Skewing, as is well known in the art, causes the module to operate poorly in certain directions. In accordance with the present invention, with the radio frequency antenna being incorporated in the rearview mirror of the vehicle, a convenient, simple, and affordable solution is provided which accommodates radio frequency applications across various vehicle platforms and models. In addition, the rearview mirror not only provides a very satisfactory universal location, but the rearview mirror can also accommodate the electronic components required with the antenna, all in one package which may be readily connected to the vehicle wiring harness.

The use of a multielement array antenna in the mirror housing increases the power gain and increases the signal-to-noise ratio that could reduce the number of the amplification stages needed to receive or transmit a radio frequency signal. The multielement array antenna can also provide directional patterns to improve the gain or to provide less interference with other modules. This concept can also be used, for example, with electrochromic exterior door mirrors as a multielement array antenna connected to the inside rearview mirror of the vehicle.

As is well known in the art, most modules utilized to date in automotive applications for radio frequency receiving are vertically polarized, whereas the associated transmitting device is usually horizontally polarized. Prior keyless entry systems provide an example of such polarization in that the receiving antenna is normally disposed along the "A" pillar of the vehicle and is vertically polarized in the vehicle while the hand held unit is usually held by the user thereof in a horizontal position and is horizontally polarized. As is also well known in the art, it is important that the polarization be the same for both the receiver and the transmitter so as to prevent loss of a major portion of the signal, and the inside rearview mirror can be easily horizontally polarized.

Referring to FIGS. 2 and 3 of the drawings, and as described in detail in U.S. Pat. No. 4,902,108, which is incorporated herein in its entirety by reference, the basic structural elements of a typical automatic rearview mirror incorporated in systems embodying the present invention are illustrated. These elements include front and rear glass elements 36 and 38, respectively, a spacing seal 40, which spaces apart and holds the glass elements 36 and 38 in spaced relationship in an assembled mirror. A space 42 is defined, in an assembled mirror, by electrode layers 44 and 46 provided on the front and rear glass elements 36 and 38, respectively. In an assembled mirror, the space 42 is preferably filled, or nearly filled, in case room is left for expansion with temperature increases, with any of the solutions disclosed in U.S. Pat. No. 4,902,108 issued Feb. 20, 1990, which is assigned to the assignee of the present invention, such solutions having reversibly variable transmittance in the operation of the mirror. The solution in the space 42 is in contact with both electrode layers 44 and 46 during operation of the mirror. One of the layers 44 or 46 may be a transparent conductor or may be a metal layer, such as silver, which acts both as an electrical conductor and a reflector surface as may be desirable for use in an electrochromic rearview mirror. The structural elements illustrated in FIG. 2 and 3 are described in greater detail in U.S. Pat. No. 4,902,108. A preferred arrangement for connecting the electronic conductive layers to a power source is also illustrated in FIGS. 2 and 3. In this arrangement, the front and rear glass elements 36 and 38 are displaced in opposite directions laterally from the solution space 42, in order to provide exposed areas 48 and 50. Electrically conductive spring clip type bus bars 52 and 54 are provided which are preferably made of beryllium copper coated with tin. The bus bars are generally channel shaped in cross section and may be provided with kerfs 55 to permit bending thereof in the event the upper edge of the glass is curved. The bus bars are placed on the coated glass elements 36 and 38 to make electrical contact with the exposed areas 48 and 50 of the electrode layers 44 and 46. In accordance with the present invention, the bus bars 52 and 54 and the associated conductive layers 44 and 46 perform a double function of applying voltage to the electrochromic solution in the space 42 and also function as an antenna in the radio frequency control system. Suitable electrical conductors, such as 56 and 58, may be soldered or otherwise connected to the bus bars so that the desired voltage may be applied to the bus bars from a suitable power source and at the same time the bus bars may be connected to the radio frequency control system. For best performance, the electrical connections of the amplifier 24 to the bus bars 52 and 54 are preferably near the centers of the bus bars. As shown in FIG. 3, the mirror also includes a reflector surface 60 which may be made of silver. A double sided circuit board 32 can be utilized to support various electrical components of the system 10.

Thus the automatic electrochromic mirror has at least five conductive surfaces, namely the silver reflective surface 60, the two transparent conductive coatings 44 and 46 on the inner glass surfaces of the electrochromic element, plus the double sided circuit board 32 with ground plane surfaces 61 and 62 to provide a multielement array antenna. It will be understood that one surface can serve as a director resonator while another surface can provide a reflector resonator. The other surfaces can also be used as driver and parasitic resonators. This type of antenna can provide an impressive five to ten decibel gain over a conventional dipole antenna. Moreover, the mirror provides large conductive surface areas for UHF signals with minimal attenuation losses. It will be understood by those skilled in the art that the conductive surfaces can be tuned through conventional well-known transmission transformer circuitry to match the receiver input or transmitter output stages. The conductive surface spacing or through phase tuning of each conductive surface can provide bi-directional directivity, bandwidth, and gain control, depending on frequency.

It will be understood that manually actuated mirrors have two conductive surfaces which are the silver reflective surface and with RF circuitry added, the circuit board ground plane. Thus manually actuated mirrors can provide either two element parasitic element arrays or a conventional dipole antenna resonator. The present invention can also be used with electrochromic exterior door mirrors, such as 64 and 66, as a multielement array antenna connected to the interior rearview mirror.

With respect to the inside rearview mirror 22, the silver mirror reflector surface 60 can serve as an antenna reflector element when connected through a conventional tuned transformer circuit (not shown). The transparent conductive coatings 44 and 46 can be utilized as the antenna driving element, or one of the transparent conductive coating surfaces can be utilized either as the antenna director or as an additional driving element of the multielement array. The printed circuit board 32, which is positioned behind the silver reflector surface 60, and its ground planes can be utilized either as a parasitic reflector or as part of a dipole driving element. In its simplest form any of the conductive surfaces of the electrochromic mirror can act as the antenna driver for the radio frequency circuit positioned inside the mirror housing. One practical design can utilize the inner conductive coating and the circuit board ground planes to produce an omnidirectional pattern. It will be understood that other conducting surfaces can be utilized to form a multielement array for a progressively higher performing antenna when such an application is required.

It will also be understood that the inside rearview element surfaces or the exterior door mirror element surfaces can be utilized as an antenna for radiating and receiving radio frequency signals that either control functions in a vehicle such as a security alarm, keyless entry, engine start controls, panic alarms, or for sending and receiving information useful to the driver of the vehicle or to facilitate vehicle operations.

It will be understood by those skilled in the art that an ideal antenna for producing the best pattern should be positioned on the outside at the top of the vehicle. However, such positioning is not practical or cost effective, whereas the rearview mirror can provide the electronics and antenna which serve as the most cost effective approach to provide desired radio frequency performance. The inside rearview mirror has an advantage over other components of the vehicle because the rearview mirror can be accessed from all angles for omnidirectional performance as desired. The inside rearview mirror is conventionally mounted on or near the windshield of the vehicle so that the rearview mirror is considered to be in free space for high radio frequency signals that will not be influenced because of high density conductive materials that would misdirect the radio frequency signals. Depending on the radio frequency required, the conductive surfaces in the mirror can be transformed to their resonant frequency through the agency of a conventional transmission transformer or a conventional simple LC network. The spacing of the conductive surface and/or tuning the wave length of each conductive surface can provide control for either omnidirectional antennas or bi-directional multielement array antennas. Such circuits can be resonated at any desired frequencies to adjust for the desired radio frequency pattern.

In accordance with the present invention, an exterior electrochromic door mirror can be utilized to provide a greater range of operation, and this can be done in combination with the wiring harness whereby the wiring harness is utilized as a tuned circuit with the outside mirror element surfaces. The fact that these conducting mirror surfaces can simultaneously be utilized for multiple purposes provides an opportunity whereby those conductive surfaces which are already present in an existing rearview mirror can also be utilized as a radio frequency antenna in a superior location for little additional cost.

It shall also be understood that the bus bars 52 and 54 and the glass conductive coatings 44 and 46 have large surface areas which makes them effective signal gatherers in that increased surface area increases the velocity factor of the antenna. The two conductive coatings act as large plates of a capacitor and at radio frequencies that capacitor phenomena acts like a low impedance circuit. This increases the surface area of the antenna for better performance and causes the electrochromic mirror to act as a single antenna element.

Another embodiment of the invention is illustrated in FIG. 5. This embodiment of the invention includes a radio frequency control system generally designated 110 comprised of a conventional radio frequency transmitter 142 and an associated code generator 145 which are mounted on the vehicle and which are automatically actuated, as by conventional switch means (not shown) operable when someone, for example, touches the vehicle. This embodiment of the invention also utilizes the electrochromic mirror bus bars 52 and 54, previously described, as an antenna effective to transmit radio frequency signals to a conventional, combined portable radio frequency receiver, decoder and safety unit 126 which may, for example, include an alarm 128 effective to apprise the user thereof that someone is tampering with the associated vehicle. This embodiment of the invention preferably includes the rearview mirror 22 and associated control circuitry 30 installed in the vehicle in the manner previously described. However, the mirror may be in the form of a manually actuated mirror as previously described. The bus bars 52 and 54 of the type previously described are electrically connected to the control circuitry 30 for the electrochromic mirror and to the conductive surfaces, such as a reflective surface, embodied in the mirror as previously described, and the bus bars and associated conductive surfaces function as an antenna to transmit radio frequency signals from the mobile transmitter to the portable receiver. For best performance the electrical connections of the transmitter 142 to the bus bars are preferably near the centers of the bus bars.

The following is an identification of various components of the systems 10 and 110 which are described above:

| 24 | Amplifier | Type UAA3201T VHF/UHF Remote Control Receiver (Application note on amplifier section) | Phillips Semiconductors 2001 W. Blue Heron Blvd. P. O. Box 10330 Riviera Beach, FL 33404 |
|---|---|---|---|
| 26 | Receiver | Type UAA32101T VHF/UHF Remote Control Receiver | Phillips Semiconductors 2001 W. Blue Heron Blvd. P. O. Box 10330 Riviera Beach, FL 33404 |
| 28 | Decoder | Type MC145032 CMOS Decoder | Motorola, Inc. P. O. Box 20912 Phoenix, AZ 85036 |
| 142 | Transmitter | Type MC2831 Low Power FM Transmitter (Application note ANHK02) | Motorola, Inc. P. O. Box 20912 Phoenix, AZ 85036 |
| 145 | Encoder | Type MC145031 CMOS Encoder | Motorola, Inc. P. O. Box 20912 Phoenix, AZ 85036 |

It will be understood that these specified components may be varied depending upon the particular applications of the principles of the present invention.

While preferred embodiments of the invention have been illustrated and described, it will be understood that various changes and modifications may be made without departing from the spirit of the invention.

What is claimed is:

1. In a radio frequency control system for use in connection with an automotive vehicle, the combination including code generating means, a radio frequency transmitter operatively associated with said code generating means, a first antenna connected to said transmitter, a second antenna, a radio frequency receiver connected to said second antenna, and decoding means connected to said receiver and having at least one output adapted to control a safety unit, one of said antennas including an electrically conductive surface incorporated in a rearview mirror installed on a vehicle.

2. The combination as set forth in claim 1, said radio frequency transmitter and said code generating means being portable.

3. The combination as set forth in claim 1, said radio frequency receiver being installed on a vehicle.

4. The combination as set forth in claim 1, said radio frequency receiver being portable.

5. The combination as set forth in claim 1, said radio frequency transmitter and said code generating means being installed on a vehicle.

6. The combination as set forth in claim 1, said one of said antennas including an electrically conductive bus bar incorporated in said rearview mirror.

7. The combination as set forth in claim 1, said rearview mirror including an electrically conductive surface, said one of said antennas including a bus bar electrically connected to said electrically conductive surface.

8. The combination as set forth in claim 1, said rearview mirror including at least two electrically conducting surfaces, said one of said antennas including a bus bar effectively connected to each of said electrically conductive surfaces at radio frequencies.

9. In a radio frequency control system, the combination including a radio frequency transmitter, a first antenna connected to said transmitter, a radio frequency receiver adapted to receive radio frequency signals emanating from said first antenna and having an output, code generating means operatively associated with said transmitter, decoding means operatively associated with said receiver, and a rearview mirror installed on a vehicle, said rearview mirror including an electrically conductive surface, and an electrically conductive bus bar electrically connected to said electrically conductive surface, said electrically conductive surface and said bus bar functioning as a second antenna connected to said receiver.

10. The combination as set forth in claim 9, said radio frequency transmitter and said code generating means being portable.

11. The combination as set forth in claim 9, said radio receiver being installed on a vehicle.

12. The combination as set forth in claim 9, said radio receiver being portable.

13. The combination as set forth in claim 9, said radio frequency transmitter and said code generating means being installed on a vehicle.

14. The combination as set forth in claim 9 including amplifying means connected to said receiver.

15. The combination as set forth in claim 9, said rearview mirror including at least two electrically conducting surfaces effectively connected to said bus bar at radio frequencies.

* * * * *